(12) United States Patent
Na et al.

(10) Patent No.: US 6,847,412 B2
(45) Date of Patent: Jan. 25, 2005

(54) ILLUMINATION SYSTEM IN LIQUID CRYSTAL PROJECTOR

(75) Inventors: Man Ho Na, Kyonggi-do (KR); Ho Joong Kang, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/024,568

(22) Filed: Dec. 21, 2001

(65) Prior Publication Data

US 2002/0113917 A1 Aug. 22, 2002

(30) Foreign Application Priority Data

Dec. 23, 2000 (KR) ........................................ 2000-81419

(51) Int. Cl.[7] ............................................ G02F 1/1335
(52) U.S. Cl. ...................... 349/5; 349/8; 349/9; 349/61; 353/31; 353/34
(58) Field of Search ............................. 349/5, 8, 9, 61, 349/16; 353/31, 34, 38

(56) References Cited

U.S. PATENT DOCUMENTS

| | | | | |
|---|---|---|---|---|
| 6,144,420 A | * | 11/2000 | Jung | 349/8 |
| 6,219,111 B1 | * | 4/2001 | Fukuda et al. | 349/5 |
| 6,273,569 B1 | * | 8/2001 | Iechika et al. | 353/38 |
| 6,351,295 B2 | * | 2/2002 | Kakuda et al. | 349/5 |

* cited by examiner

*Primary Examiner*—Tom Thomas
*Assistant Examiner*—Matthew C. Landau
(74) *Attorney, Agent, or Firm*—Fleshner & Kim, LLP

(57) ABSTRACT

Illumination system in a liquid crystal projector for improving an optical efficiency of a fly eye lens, including a light source, a first fly eye lens having first lens cells each with a first center point, and second lens cells each with a second center point disposed in outer parts of the first lens cells, for receiving beams of lights from the light source in correspondence to the first center points of the first lens cells and the second center points of the second lens cells, respectively, and a second fly eye lens having a plurality of lens cells for refracting the beams from the first fly eye lens into parallel beams.

14 Claims, 5 Drawing Sheets

ILLUMINATION SYSTEM IN LIQUID CRYSTAL PROJECTOR

This application claims the benefit of the Korean Application No. P2000-81419 filed on Dec. 23, 2000, which is hereby incorporated by reference.

BACKGROUND OF THE INVENTION

1. Field of the Invention

The present invention relates to an optical system for a liquid crystal projector, and more particularly, to an illumination system in a liquid crystal projector.

2. Background of the Related Art

Recently, projectors are paid attention as flat displays that are thin and have a large sized screen. As the projector, which enlarges and projects a small picture, a liquid crystal projector that is thin is used mostly. However, the liquid crystal projector can not provide a clear picture under a bright environment. In order to solve this problem, a related art projector employs lenses in an illumination system. FIG. 1 illustrates a related art illumination system in a liquid crystal projector.

Referring to FIG. 1, the related art illumination system is provided with first, and second fly eye lenses 4 and 6, and a polarizing beam sprite (PBS) array, which are arranged in parallel on an optical path between a light source 2 and a focusing lens 9.

A beam of white light from the light source 2 is incident on the first fly eye lens 4, and the first fly eye lens 4 having a plurality of micro-lens cells splits the beam in lens cell units, and directs to respective lens cells of the second fly eye lens 6. The second fly eye lens 6 refracts the beam from the first fly eye lens 4 into a parallel beam, and directs to the PBS array 8, and the PBS array 8 splits the beam from the second fly eye lens 6 into a P polarization beam and an S polarization beam. The PBS array 8 forwards the split S polarization beam as it is while the PBS array 8 converts the P polarization beam into an S polarization beam before forwarding the P polarization beam. The focusing lens 9 converges the S polarization beam from the PBS array 8 to a minimum incidence angle for preventing an optical loss and improving an optical efficiency. A luminance efficiency of the foregoing illumination system in the liquid crystal projector is related to correspondence of the beam from the light source with the lens cells of the first fly eye lens.

Referring to FIG. 2, a beam of light emitted from a lamp 2A is totally reflected at a parabolic reflector 2B, and incident on a first fly eye lens 4 in a form of quasi-parallel beam. In this instance, while most of the beam from a center 'P' of the lamp 2A is reflected at the parabolic reflector 2B, and incident on a center point of respective lens cells of the first fly eye lens 4, the beams L1, and L1' reflected in the vicinity of a center part '0' of the parabolic reflector 2B are not incident on center points of the lens cells 4A and 4B, but on points deviated to one side of the center points.

That is, referring to FIG. 3, it can be known that the beams of lights L1, L2, and L3 emitted from the lamp 2A, and reflected at a first reflection point RI in the vicinity of the center part '0' the parabolic reflector 2B are incident on a first lens cell 4A in the center part of the first fly eye lens 4. In this instance, the first beam L1 emitted from a center point P2 of the lamp 2A, and reflected at the first reflection point R1 of the parabolic reflector 2B is, not incident on a center of the first lens cell 4A, but a point deviated to one side of the center point, because a first angle θ− and a second angle θ+ differ owing to a length of the lamp 2A. The first angle θ− is an angle between the first beam L1 and the second beam L2 incident on the first reflection point R1 on the parabolic reflector 2B from the first point P1 and the second point P2 of the lamp 2A respectively, and the second angle θ+ is an angle between the third beam L3 and the first beam L1 incident on the first reflection point R1 on the parabolic reflector 2B from the third point P3 and the first point P1 of the lamp 2A respectively. The first, and the second angles may be expressed as the following equations (1).

$$\theta- = \tan1^{-1}\frac{-z1}{y1} - \tan1^{-1}\frac{-z1+L/2}{y1},$$

$$\theta+ = \tan1^{-1}\frac{-L/2-z1}{y1} + \tan1^{-1}\frac{-z1}{y1},$$

Where, y1 and z1 denote coordinates of the first reflection point R1 on z-y coordinate axes in FIG. 2, and 'L' denotes the length of the lamp 2A. It can be known from the equation (1) that the first, and second angles θ− and θ+ differ, wherein the second angle θ+ is smaller than the first angle θ+, relatively.

Thus, due to the difference of the first, and second angles, the second beam L2 from the second point P2 of the lamp 2B is reflected at the first reflection point R1 on the parabolic reflector 2B, and incident on a second lens point FL2 at a top of the first lens cell 4A, the third beam L3 from the third point P3 of the lamp 2B is incident on a third lens point FL3 at a bottom of the first lens cell 4A via the first reflection point R2, and the first beam L1 from the first point P1 is incident on a first lens point FL1 at a location deviated from a center of the first lens cell 4A to downward via the first reflection point R1. In other words, an arc light emission center point P1 of the lamp 2A and the center point of the lens cell 4A are not in correspondence. As shown in FIG. 2, such a non-correspondence of the center points mostly occurs at lens cells 4A and 4B in a central region of the first fly eye lens 4.

FIG. 4 illustrates a beam distribution of an image formed on a second fly eye lens 6 through a first fly eye lens 4 of beams from the lamp 2A, wherein it can be known that beam distributions on lens cells in a central part 'A' are scattered widely in a height direction of the second fly eye lens 6 more than beam distributions on lens cells in other parts of the second fly eye lens 6. An optical efficiency in the center part of the second fly eye lens 6 where the beam distribution is greater is poor in comparison to the other part when the beam distribution is smaller. Accordingly, the non-correspondence of the center points of the lamp and the lens cells is a cause of the poor optical efficiency of the liquid crystal projector.

SUMMARY OF THE INVENTION

Accordingly, the present invention is directed to an illumination system in a liquid crystal projector that substantially obviates one or more of the problems due to limitations and disadvantages of the related art.

An object of the present invention is to provide an illumination system in a liquid crystal projector which can improve an optical efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the illumination system in a liquid crystal projector includes a light source, a first fly eye lens having first lens cells each with a first center point, and second lens cells each with a second center point disposed in outer parts of the first lens cells, for receiving beams of lights from the light source in correspondence to the first center points of the first lens cells and the second center points of the second lens cells, respectively, and a second fly eye lens having a plurality of lens cells for refracting the beams from the first fly eye lens into parallel beams.

The first center point of the first lens cell is located at a point a distance away from a center axis of the first lens cell, on which the beam from the light source is incident, and the second center point of the second lens cell is located at the center axis of the second lens cell.

The first lens cells are arranged in a center part of the first fly eye lens along a height direction center line of the first fly eye lens, the first lens cells are arranged in a center part of the first fly eye lens along a width direction center line of the first fly eye lens, or the first lens cells are arranged in a radial direction centered on a center of the first fly eye lens.

In another aspect of the present invention, there is provided an illumination system in a liquid crystal projector including an arc lamp for emitting beams of lights by arc light emission, a parabolic reflector for making total reflection of the beams from the lamp to direct the beams in one direction, a first fly eye lens having first lens cells each with a center point shifted a distance away from a center axis of the first lens cell, and second lens cells each with a center point at the center axis of the second lens cell disposed in outer parts of the first lens cells, for receiving the beams reflected at the parabolic reflector in correspondence to the center points of the first lens cells and the second lens cells, and a second fly eye lens having a plurality of lens cells for refracting the beams from the first fly eye lens into parallel beams.

The first lens cells are arranged in a center part of the first fly eye lens along a height direction center line of the first fly eye lens, the first lens cells are arranged in a center part of the first fly eye lens along a width direction center line of the first fly eye lens, or the first lens cells are arranged in a radial direction centered on a center of the first fly eye lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings FIGS. 5–9.

Figure 5:
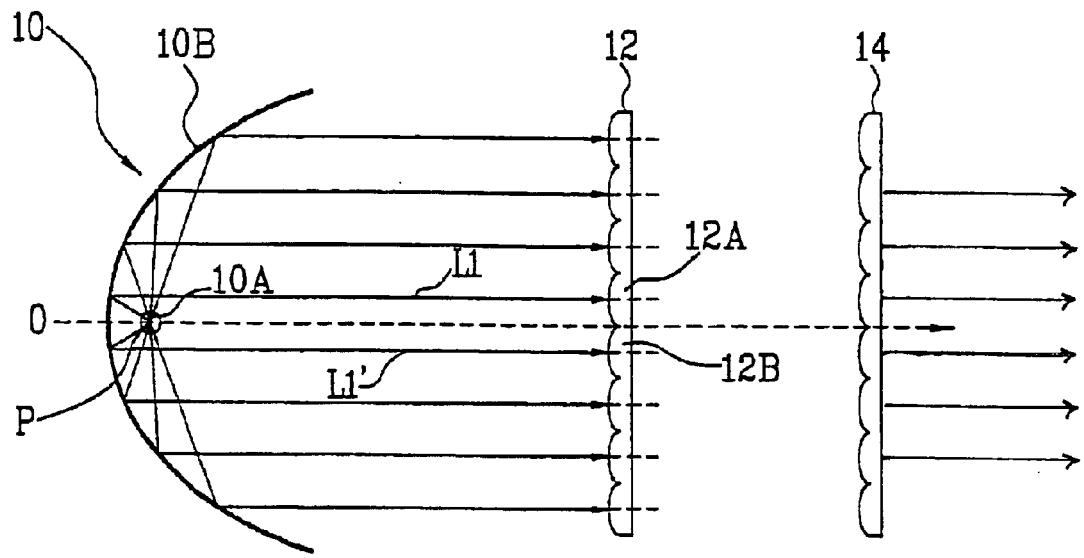
FIG. 5 illustrates an illumination system in a liquid crystal projector in accordance with a preferred embodiment of the present invention.

The present invention suggests making an arc light emission center of a lamp and lens cell centers of a first fly eye lens correspondent, for improving an optical efficiency. FIG. 5 illustrates an illumination system in a liquid crystal projector in accordance with a preferred embodiment of the present invention.

Referring to FIG. 5, the illumination system in a liquid crystal projector in accordance with a preferred embodiment of the present invention includes a light source 10 for emitting a beam of light, and a first fly eye lens 12 for focusing the beam from the light source 10 onto lens cells of another fly eye lens. The light source 10 has an arc lamp 10A, and a parabolic reflector 10B surrounding the lamp 10A.

The first fly eye lens 12 has a matrix of first lens cells and second lens cells, each having different center points. The second lens cells are arranged around the first lens cells. That is, the first lens cells are arranged in a central part of the first fly eye lens 12 along a height direction center axis of the first fly eye lens 12, in a central part of the first fly eye lens 12 along a width direction center axis of the first fly eye lens 12, or in a central part of the first fly eye lens 12 along radial direction center axes of the first fly eye lens 12, and the second lens cells are arranged in outer part of the first lens cells.

The first lens cell has a center point (e.g., CP1) at a point a distance away from a center axis (e.g., CA1) of the first lens cell, and the second lens cell has a center point (e.g., CP2) at a center axis (e.g., CA2) of the second lens cell. That is, the center point of the first lens cell is fixed according to a beam incident point on the first lens cell. In general, the center point of the lens cell can be shifted to a desired point in formation of the lens cell.

Referring to FIG. 5, white beams of lights generated by arc light emission at the lamp 10A are totally reflected at the parabolic reflector 10B in a form of quasi-parallel beams, and directed toward the first fly eye lens 12. The first fly eye lens 12 splits the beams from the light source 10 in lens cell units, and focuses onto lens cells of the second fly eye lens 14, and the second fly eye lens 14 refracts the beam from the first fly eye lens 12 into parallel beams.

Thus, the first fly eye lens 12 of the present invention can correct the non-correspondence of the center P1 of arc light emission of the lamp 10A and the centers of lens cells by arranging first lens cells each having a shifted center point in the central region (a region the center P1 of arc light emission and the centers of lens cells are not correspondent) of the first fly eye lens 12.

As shown in FIG. 5, it can be known that, by shifting the center point of each of lens cells 12A and 12B in the region the center P1 of arc light emission and the centers of the lens cells 12A and 12B are not correspondent toward a center axis direction of the first fly eye lens 12, the center point of each of lens cells 12A and 12B corresponds to the center point P1 of a length of the arc light emission.

Figure 6:
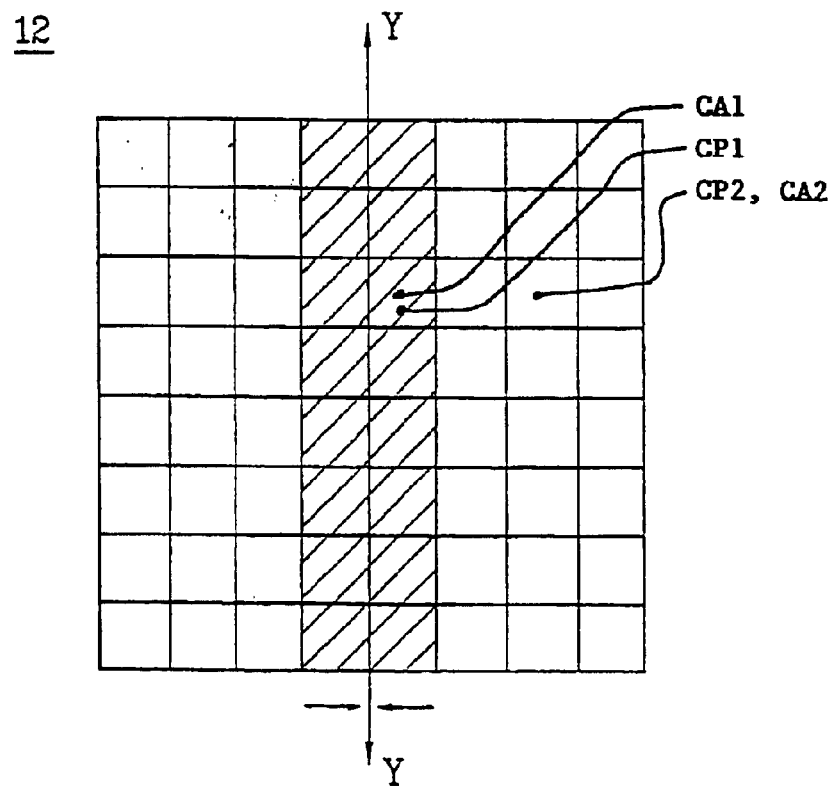
FIGS. 6 and 7 illustrate disposition of lens cells having center points shifted among lens cells of a first fly eye lens in FIG. 5.
Figure 7:
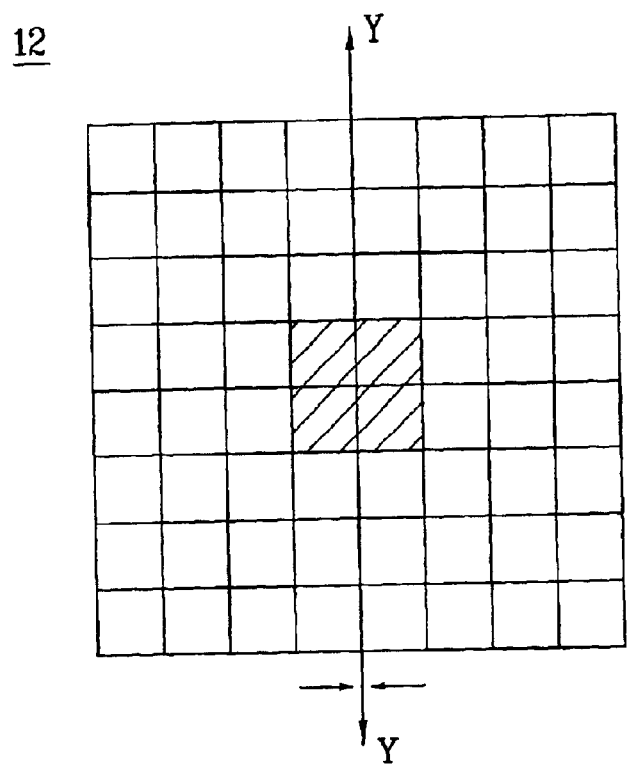

The lens cells 12A and 12B having shifted center points so as to correspond to the center point P1 of the length of the arc light emission may be arranged in the center part of a width of the first fly eye lens 12 to be disposed along a height direction center line 'Y' of the first fly eye lens 12 like a hatched part in FIG. 6, or in a radial direction centered at the center point of the first fly eye lens 16 like a hatch part in FIG. 7.

Or as another embodiment, the lens cells 12A and 12B having shifted center points may be arranged in the center part of a height of the first fly eye lens 12 to be disposed along a width direction center line of the first fly eye lens 12.

Figure 8:
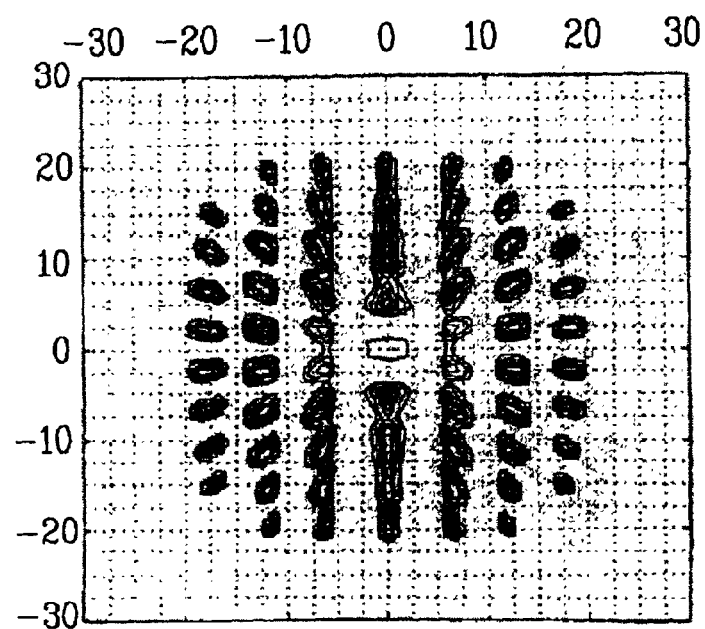
FIG. 8 illustrates a beam distribution of an image formed on a second fly eye lens in FIG. 5; and, FIG. 9 illustrates a graph showing a difference of optical efficiencies between the present invention and the related art.

Referring to FIG. 8, a beam distribution of the beams emitted from the lamp 10A, reflected at the parabolic reflector 10B, and focused onto the second fly eye lens 14 via the first fly eye lens 12, is shown, of the case of the first fly eye lens 12 of which lens cells 12A and 12B having shifted center points are arranged in the center part of a width of the first fly eye lens 12 to be disposed along a height direction center line 'Y' of the first fly eye lens 12 as shown in FIG. 6.

Figure 4:
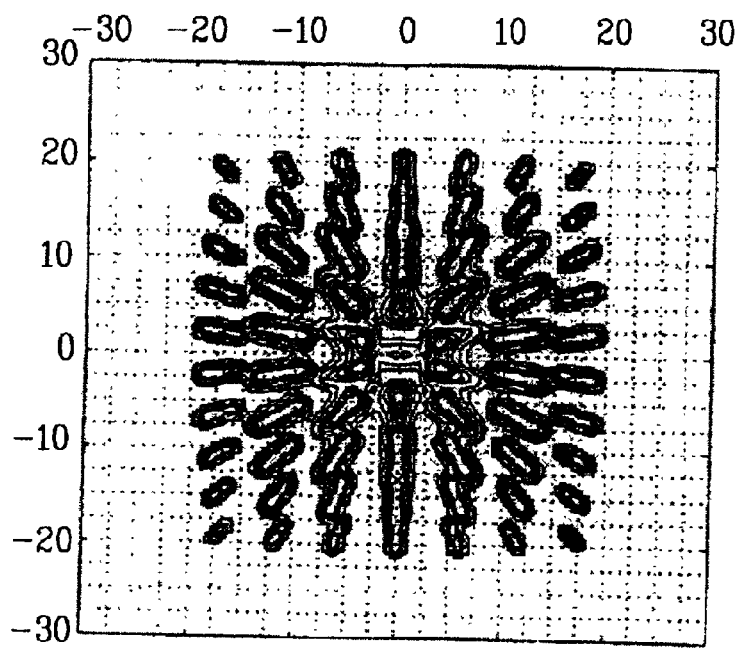
FIG. 4 illustrates a beam distribution of an image formed on a second fly eye lens in FIG. 1.

If the beam distribution of the present invention shown in FIG. 8 is compared to the beam distribution of the related art, it can be known that, though the beam distribution 'A' of an image formed on lens cells in the center part along the height direction of the second fly eye lens 6 shown in FIG. 4 is scattered widely more than the beam distribution of the image formed on the lens cells in other parts of the second fly eye lens 6, the beam distribution 'B' of the image formed on the lens cells in the center part along the height direction of the second fly eye lens 14 shown in FIG. 8 is equal to the beam distribution of the image formed on the lens cells in other parts of the second fly eye lens 14 owing to first fly eye lens 12 having the lens cells 12A and 12B with shifted center points.

Thus, the focusing, and forming of an image even on the center part lens cells of the second fly eye lens 14 equal to other part lens cells improves the optical efficiency.

Figure 1:
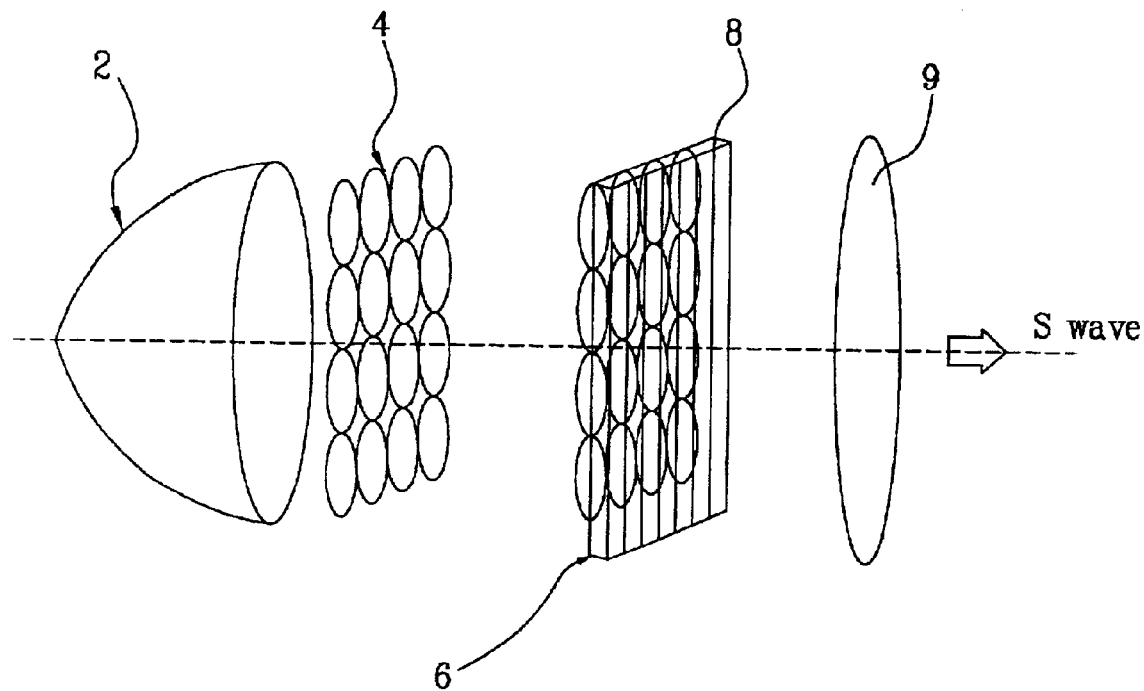
FIG. 1 illustrates a related art illumination system in a liquid crystal projector.
Figure 2:
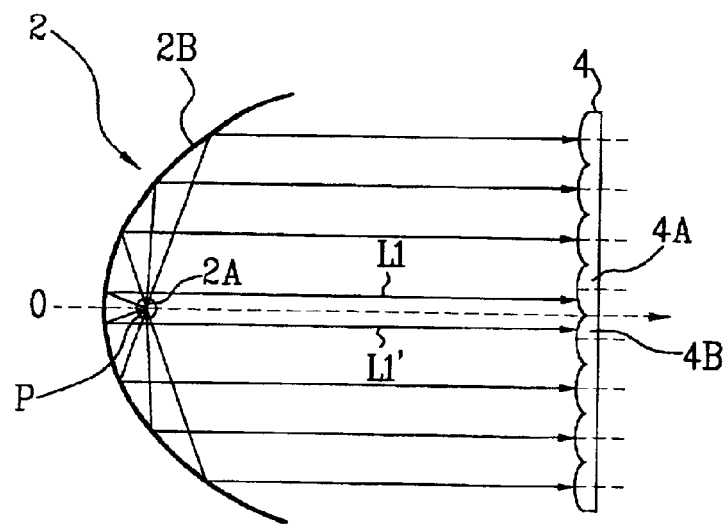
FIG. 2 illustrates beams of lights incident on a first fly eye lens from the lamp in FIG. 1.
Figure 3:
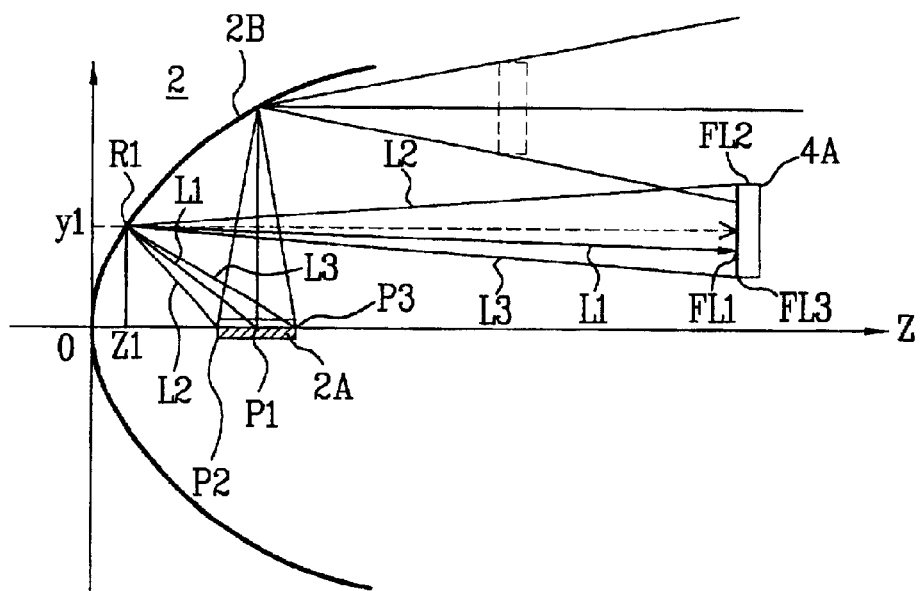
FIG. 3 illustrates a non-correspondence between a center of the lamp in FIG. 1 and a center of a lens cell in FIG. 1.
Figure 9:
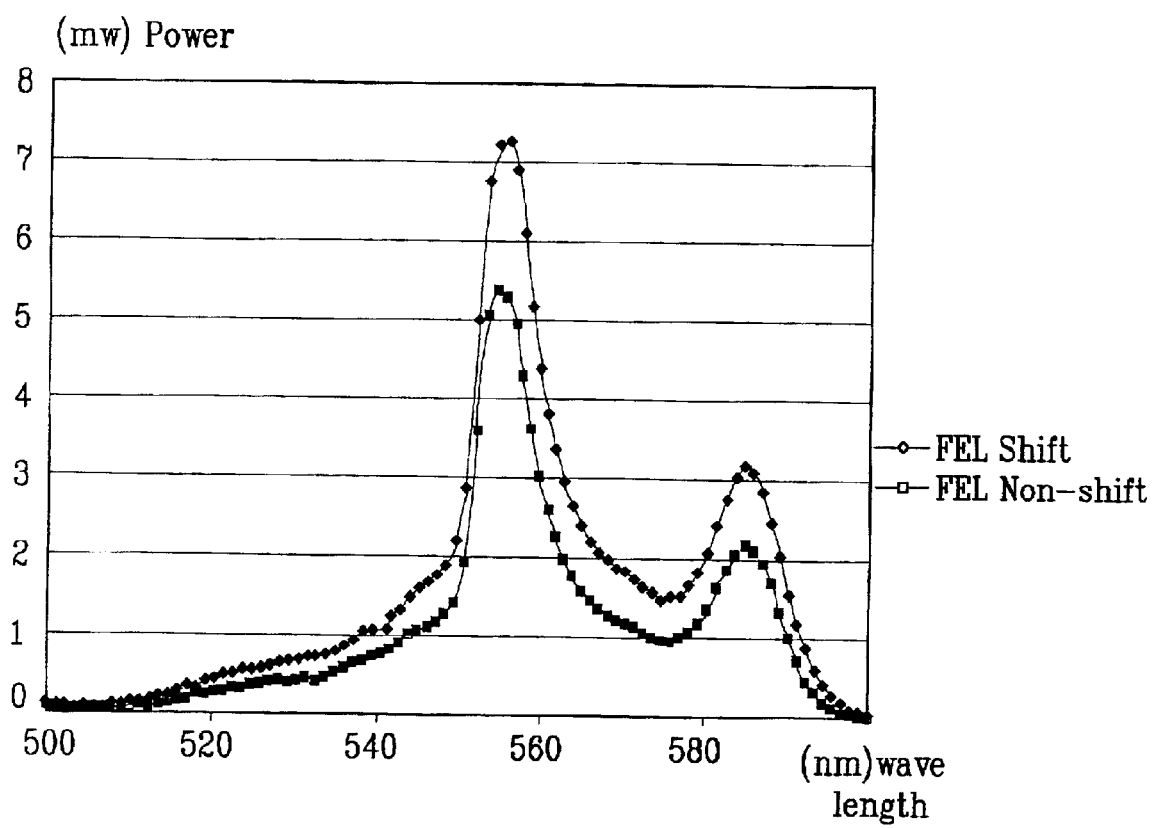

FIG. 9 shows results of tests of an optical efficiency of the illumination system with the related art first fly eye lens 4 in FIG. 2, and an optical efficiency of the illumination system with the first fly eye lens 12 of the present invention in FIG. 5, wherein it can be known that the optical efficiency of the illumination system with the first fly eye lens 12 of the present invention shown in FIG. 5 having the lens cells with shifted center points to correspond to a length center of the arc light emission is improved in comparison to the optical efficiency of the illumination system with the related art first fly eye lens 4 of the present invention shown in FIG. 2. Particularly, the optical efficiency of the illumination system of the present invention is improved approx. 45% in a green waveband.

As has been explained, the illumination system in a liquid crystal projector of the present invention can improve the optical efficiency by arranging lens cells with shifted center points in a region wherein center points of lens cells of the first fly eye lens and the center point of a length of the arc light emission do not correspond. Particularly, the illumination system in a liquid crystal projector of the present invention can improve the optical efficiency by approx. 45% in a green waveband, thereby permitting to provide a clearer picture.

It will be apparent to those skilled in the art that various modifications and variations can be made in the illumination system in a liquid crystal projector of the present invention without departing from the spirit or scope of the invention. Thus, it is intended that the present invention cover the modifications and variations of this invention provided they come within the scope of the appended claims and their equivalents.

What is claimed is:

1. An illumination system in a liquid crystal projector, comprising:

a light source including an arc lamp emitting beams of light by arc light emission and a parabolic reflector for making total reflection of the beams from the arc lamp to direct the beams in one direction;

a first fly eye lens including an n×m matrix of lens cells which are for imaging the beams incident from the light source on various points spaced apart from one another, wherein each lens cell of the first fly eye lens is a micro-lens, wherein the first fly eye lens has a first plurality of lens cells each with an optical axis offset relative to a center point of the lens cell in order to compensate for a shape of the arc lamp; and a second fly eye lens refracting the beams from the first fly eye lens into parallel beams, wherein the first fly eye lens comprises a plurality of lens cells corresponding to a plurality of n×m lens cells of the second fly eye lens, respectively, and wherein n and m are integers greater than 2.

2. The illumination system as claimed in claim 1, wherein the first plurality of lens cells of the first fly eye lens have the optical axis thereof arranged to be shifted towards a central axis of the first fly eye lens.

3. The illumination system as claimed in claim 1, wherein the first plurality of lens cells of the first fly eye lens are arranged in a width direction of the central axis of the first fly eye lens.

4. The illumination system as claimed in claim 1, wherein the first plurality of lens cells of the first fly eye lens are arranged in a height direction of the central axis of the first fly eye lens.

5. The illumination system as claimed in claim 1, wherein the first plurality of lens cells of the first fly eye lens are arranged in a radial direction of the central axis of the first fly eye lens.

6. The illumination system as claimed in claim 1, wherein the first fly eye lens comprises a second plurality of lens cells each with an optical axis substantially located at a center of the physical dimension of the corresponding lens cell.

7. The illumination system as claimed in claim 6, wherein the lens cells of the second fly eye lens each have an optical axis substantially located at a center of the physical dimension of the corresponding lens cell.

8. The illumination system as claimed in claim 7, wherein the lens cells of the first fly eye lens are substantially equal in shape and size, and wherein the lens cells of the second fly eye lens are substantially equal in shape and size to each other and the lens cells of the first fly eye lens.

9. The illumination system as claimed in claim 6, wherein the first plurality of lens cells of the first fly eye lens are arranged in a height direction of the central axis of the first fly eye lens, a width direction of the central axis of the first fly eye lens or a radial direction of the central axis of the first fly eye lens.

10. An illumination system in a liquid crystal projector, comprising:

a first fly eye lens having a matrix of lens cells including first lens cells each with a first lens, and second lens cells each with a second lens disposed in the first fly eye lens, for receiving light from a light source in correspondence to the first lenses of the first lens cells and the second lenses of the second lens cells, respectively; and a second fly eye lens having a matrix of lens cells for refracting beams received from the first fly eye lens into parallel beams, wherein an optical axis of said each first lens is offset from a center of the physical dimensions of each corresponding first lens cell, and wherein an optical axis of said each second lens is substantially co-located at a center of the physical dimensions of each corresponding second lens cell, and wherein the first fly eye lens comprise a plurality of lens cells corresponding to a plurality of lens cells of the second fly eye lens, respectively.

11. The illumination system as claimed in claim 10, wherein the lens cells of the second fly eye lens each have an optical axis substantially located at a center of the physical dimension of the corresponding lens cell.

12. The illumination system as claimed in claim 11, wherein the matrix of lens cells of the first fly eye lens is n rows by m columns where n and m are each a positive integer greater than 2, and wherein the matrix of lens cells of the second fly eye lens is n rows by m columns.

13. The illumination system as claimed in claim 12, wherein the lens cells of the first fly eye lens are substantially equal in shape and size, and wherein the lens cells of the second fly eye lens are substantially equal in shape and size to each other and the lens cells of the first fly eye lens.

14. The illumination system as claimed in claim 10, wherein the first plurality of lens cells of the first fly eye lens are arranged in a height direction of the central axis of the first fly eye lens, a width direction of the central axis of the first fly eye lens or a radial direction of the central axis of the first fly eye lens.

* * * * *